(No Model.)
J. S. HOFFECKER.
COMPOSITE WASHER.
No. 264,537. Patented Sept. 19, 1882.
Fig. 1,
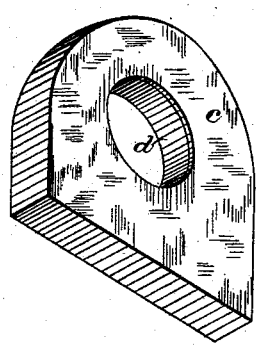
Fig. 2,
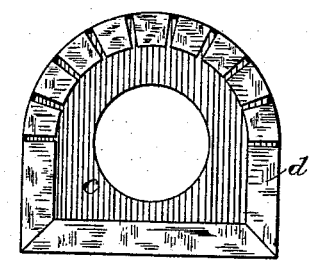
Fig. 3,
Fig. 4,
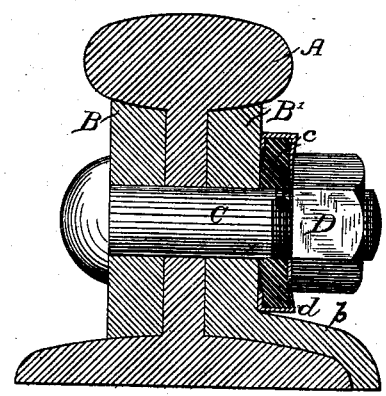
WITNESSES
Wm A. Skinkle
H. W. Elmore
INVENTOR
John S. Hoffecker,
By his Attorneys
Baldwin, Hopkins & Peyton

UNITED STATES PATENT OFFICE.

JOHN S. HOFFECKER, OF WILMINGTON, DELAWARE.

COMPOSITE WASHER.

SPECIFICATION forming part of Letters Patent No. 264,537, dated September 19, 1882.

Application filed July 7, 1882. (No model.)

*To all whom it may concern:*

Be it known that I, JOHN S. HOFFECKER, of Wilmington, in the county of New Castle and State of Delaware, have invented certain new and useful Improvements in Composite Washers, of which the following is a specification.

My invention relates to composite washers, especially useful as locks for bolt-nuts, such as shown in Letters Patent No. 207,275, granted to me August 20, 1878, consisting of a vulcanized-fiber washer combined with a metallic washer or plate.

It was at first thought that exposure to the action of the weather was desirable with the use of vulcanized-fiber washers in connection with metal washers or plates acting as nut-locks; but it has been demonstrated by practical use that protection from and not exposure to the weather is necessary in order to prevent lamination and abrasion of the washer, and that it is also highly desirable to strengthen the fiber body without impairing its capabilities and advantages as a washer.

The object of my invention, therefore, is to improve the composite washer shown in my said patent by protecting the vulcanized-fiber portion from the action of the weather and in strengthening said washer, thereby increasing its durability and efficiency.

The subject-matter claimed is particularly pointed out at the close of the specification.

In the drawings, Figure 1 is a perspective view of my improved composite washer. Fig. 2 is a view of the flat side thereof, which is placed next to the fish-plate or surface through which the bolt passes. Fig. 3 is an edge view of the semicircular portion of the washer, and Fig. 4 is a vertical transverse section through a railroad-rail and its fish-plates, showing my improvements as applied to one of the bolts connecting said rail and plates, the composite washer being also shown in section.

The rail A, at its point of junction with another rail, is provided with the usual fish-plates, B B', one, B', of which is an angular fish-plate, such as is in common use.

Bolts C are passed through the webs of the rails and through said fish-plates, and nuts D are screwed upon said bolts in the usual manner.

Surrounding the bolt C, and interposed between the nut D and the outer face of the angle fish-plate B', is one of my improved composite washers, which consists of a vulcanized-fiber washer, *c*, enveloped and surrounded by a thin flexible metallic sheet casing or plate, *d*, the said flexible plate being firmly secured to the fiber washer by being bent from one side of the washer over its edges and down upon the opposite side, as clearly shown in Figs. 2 and 4. By this means, when the composite washer is passed on over the bolt and its inner flat side is pressed against the fish-plate by tightly screwing up the nut, the edges of the fiber portion of the washer will be protected by the covering of the metal sheet or plate which envelops said edges, while its front face will also be protected by said metal sheet or plate. The rear face of the fiber washer will obviously also be protected by the tight joint between said sheet or plate and the face of the fish-plate, due to tightly screwing up the nut upon its bolt. By the use of the enveloping metal plate or casing *d* additional strength is imparted to the washer without impairing its action as a yielding washer to obviate injurious actions from strain. The fiber-washer *c* being yielding, and the metal sheet *d* being flexible, and the nut D, moreover, being smaller than said composite washer, it results, upon firmly screwing up the nut, that the central part of the fiber washer under the nut is compressed and crowded outward, and that its edges thicken, bend, or expand outside of the edges of the nut, and bend the flexible protecting-plate up around the edges of said nut, to lock it from turning upon its bolt, in the manner clearly shown in Fig. 4.

When the composite washer is to be used with an angle fish-plate, B', such as shown in Fig. 4, it will be obvious that but small space is left between the bolt and the angle portion *b* of the fish-plate for the passage of the washer, so as to rest tightly against the face of said plate.

In order to adapt a washer for efficient use under such circumstances, I construct it in the form clearly shown in the drawings—that is, with a semicircular top portion, and with a flat or straight lower edge to rest upon the angle of the fish-plate, the bolt-hole being nearer the bottom than the top of the washer.

A washer to be used as a nut-lock in the manner described may thus be employed where angle fish-plates are used, and the washer obviously cannot turn upon the bolt, for the reason that its straight edge rests evenly upon the similar top surface of the angle-piece *b* of the fish-plate.

My improved composite washer obviously may be used with bolts and nuts wherever such a washer is applicable.

I claim as my invention—

The improved composite washer consisting of a yielding washer or body, having its sides and edges enveloped by a flexible metallic plate or casing, so as to be protected and strengthened, substantially as described.

In testimony whereof I have hereunto subscribed my name this 1st day of July, A. D. 1882.

JOHN S. HOFFECKER.

Witnesses:
WM. J. PEYTON,
JAMES YOUNG.